May 11, 1948. E. V. FRANCIS 2,441,480
BIN LEVEL CONTROL
Filed June 5, 1947

INVENTOR;
EARLE V. FRANCIS,
By
ATTY.

Patented May 11, 1948

2,441,480

UNITED STATES PATENT OFFICE 2,441,480

BIN LEVEL CONTROL

Earle V. Francis, Columbus, Ohio, assignor to The Jeffrey Manufacturing Company, a corporation of Ohio Application June 5, 1947, Serial No. 752,614

6 Claims. (Cl. 200—52)

This invention relates to a bin level control, and an object of the invention is to provide improved and more sensitive apparatus of the above mentioned type.

Other objects of the invention will appear hereinafter, the novel features and combinations being set forth in the appended claims.

Figure 1:
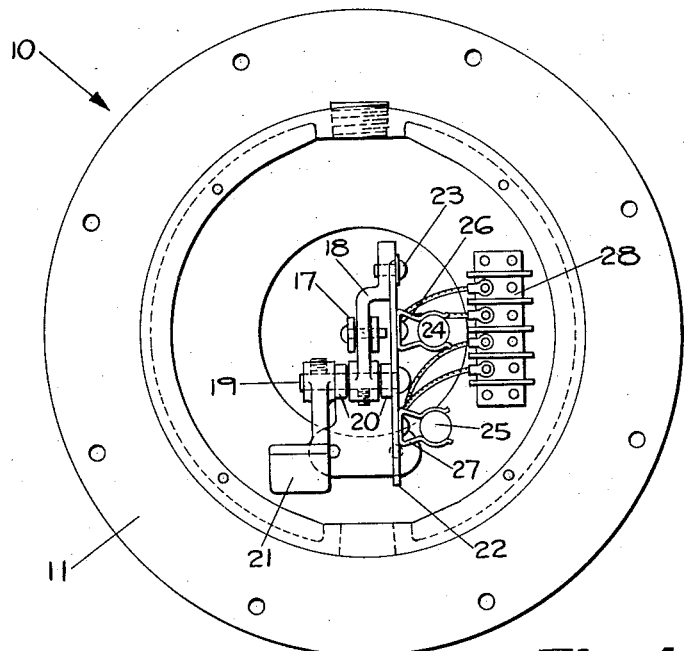
Figure 2:
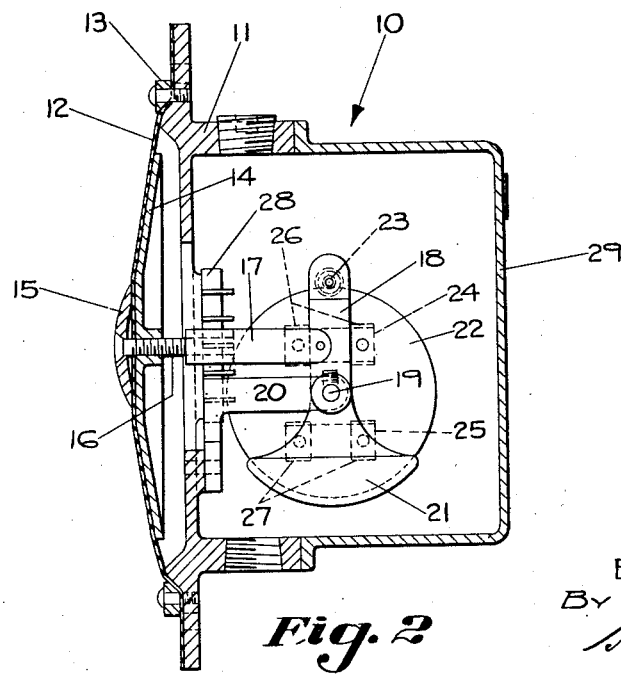

In the accompanying drawings,

Fig. 1 is a rear elevational view of the bin level control with the rear cover removed; and Fig. 2 is a sectional elevational view of the apparatus, with parts shown in elevation.

The bin level control herein disclosed and claimed constitutes an improvement on the invention of my Patent No. 2,429,158, dated October 14, 1947, entitled Bin level control.

The improved bin level control of the present invention includes a casing or housing 10 formed of a front main frame casting or frame member 11 having an integral flange adapted to be attached to a bin, or the like, adjacent an opening therein, so that the bin level indicator will be responsive to the level of the material in the bin. Stretched across the front of the casting 11 is a flexible disc-shaped diaphragm 12 which is attached to the casting 11 by a removable attaching ring 13.

A reinforcing plate or disc 14 is provided behind the diaphragm 12, and a clamping washer 15 on the outside of the diaphragm 12 clamps the center thereof to the plate or disc 14 through the intermediary of a screw 16. The inner end of screw 16 is adjustably threaded into a yoke 17, the screw 16 and yoke 17 acting as an adjustable link operating mechanism connecting the diaphragm 12 with an operating member 18 which is in the form of a pivoted arm, said arm or operating member 18 being pivotally connected by a pin 19 to the outer end of a supporting bracket 20 which in turn is attached to the frame member or casting 11.

The pivotal axis of the pivot pin 19 is practically always horizontal. The operating member 18 is preferably rigidly attached to the pin 19 by a set screw, as clearly illustrated in Fig. 1 of the drawings, to the end that pivotal movement of the operating member 18 under the influence of the diaphragm 12 will cause rotational movement of the pin 19 about a horizontal axis.

Adjustably mounted on the outer end of the pin 19 is a counterweight 21, a set screw being provided to attach it adjustably to said pin 19 so that its normal position, when the apparatus is in operation, may be adjusted, thereby to adjust the counterbalancing force which must be overcome by the material on the diaphragm 12 to effectuate a swinging or tilting operation of the operating member 18.

As clearly illustrated in the drawings, the counterweight 21 may be adjusted through 360° which is a matter of importance in providing for adjustment of the bin level mechanism to any position through 360°, so long as the axis of the pivot pin 19 is maintained substantially horizontal. In other words, the bin level control of my invention may be placed in the vertical position illustrated in Figs. 1 and 2 of the drawings or it may be rotated to any position relative thereto about an axis parallel to the axis of the pin 19 through 360°, and by adjustment of the counterweight 21 the apparatus may be so regulated that a predetermined force, which is adjustable in value, is required to effectuate operation of the bin level control.

Mounted on the opposite end of the pin 19 is a switch carrier or disc 22 preferably made of insulating material, this carrier 22 being adjustable through 360° about the axis of the pin 19, to which pin it is pivotally attached as clearly illustrated in Fig. 1 of the drawings. The disc 22 can swing freely with respect to the pin 19 about its axis and be locked to the operating member 18 in any position of adjustment by locking screw and washer 23 which cooperates with the operating member 18.

The carrier 22 carries either one or two switches, there being two switches 24 and 25 illustrated in the drawings. Switches 24 and 25 may be of the mercury tube type and preferably are of the type which are automatically connected upon being inserted in a pair of spaced brackets 26 and 27, one adjacent each end thereof. The brackets 26 and 27 are conducting clips of well known construction, their bottoms being riveted to the insulating carrier disc 22. Flexible conductors extend, one from each of the brackets 26 and 27 at opposite ends of each of the tubes 24 and 25, to a connecting block 28 at which electrical connections are made. As above stated, if desired, only one tube or switch 24, 25 may be utilized.

Furthermore, supporting brackets or clips may or may not be on parallel axes. For example, if it is desired that one of the switches be open while the other is closed, the axes of the clips 26, 27 may not be set parallel. The adjustment of the carrier disc 22 through 360° about the axis of the pin 19 provides for the aforementioned positioning of the bin level control in any position through a range of 360° about an axis parallel with the axis of pin 19. In other words, once the bin level device is put in position, as determined by the container to which it is to be attached, disc 22 is to be rotated until the switches 24 and 25, or either of them, if only one is employed, is approximately at the position where it changes from open to closed, or vice versa, with the diaphragm 12 in its extended position. Counterweight 21 is then adjusted to the desired position so that any selected force on the diaphragm will tilt the operating member 18 by rotating it about the axis of pin 19.

It is to be particularly noted that the operating member 18, the counterweight 21 and the switch carrier 22 all tilt or rotate about the axis of the pin 19. Particularly in view of the fact that the carrier 22 tilts about this axis with the operating member 18, the tilting is due entirely to rotary movement of said carrier 22. It has been found that this increases appreciably the sensitiveness of the device, as compared to my prior construction in which the tilting action produced a combination of rotary and lifting action.

As illustrated in Fig. 2 of the drawings, the casing or housing 10 includes a removable cover plate 29 removably attached to the casting 11 and cooperating therewith to provide the housing for the operating mechanism.

Obviously those skilled in the art may make various changes in the details and arrangement of the parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A level control switch mechanism including a frame, a member pivotally mounted on said frame on a horizontal axis, a switch carrier connected to said member for adjustable movement relative thereto on said horizontal axis through an angle of at least 180 degrees, means for locking said carrier to said member in any one of a plurality of positions, a counterbalance connected to said carrier for adjustment relative thereto on said horizontal axis and adjustable to opposite sides of a vertical plane passing through said horizontal axis, a switch connected to said carrier and operable by tilting of said member on said horizontal axis, and level responsive operative means for tilting said member.

2. A level control switch mechanism including a frame, a member pivotally mounted on said frame on a horizontal axis, a switch carrier connected to said member for adjustable movement relative thereto on said horizontal axis through an angle of at least 90 degrees, means for locking said carrier to said member in any one of a plurality of positions, a counterbalance connected to said carrier for adjustment relative thereto on said horizontal axis and adjustable to opposite sides of a vertical plane passing through said horizontal axis, a switch connected to said carrier and operable by tilting of said member on said horizontal axis, and level responsive operative means for tilting said member.

3. A level control switch mechanism including a frame, a member pivotally mounted on said frame on a horizontal axis, a switch carrier connected to said member for adjustable movement relative thereto on said horizontal axis, means for locking said carrier to said member in any one of a plurality of positions, a counterbalance connected to said carrier for adjustment relative thereto on said horizontal axis and adjustable to opposite sides of a vertical plane passing through said horizontal axis, a switch connected to said carrier and operable by tilting of said member on said horizontal axis, and level responsive operative means for tilting said member.

4. A level control switch mechanism including a frame, a member pivotally mounted on said frame on a horizontal axis, a switch carrier connected to said member for adjustable movement relative thereto on said horizontal axis, means for locking said carrier to said member in any one of a plurality of positions, a counterbalance connected to said carrier for adjustment relative thereto on said horizontal axis, a switch connected to said carrier and operable by tilting of said member on said horizontal axis, and level responsive operative means for tilting said member.

5. A level control switch mechanism including a frame, a member pivotally mounted on said frame on a horizontal axis, a switch carrier connected to said member for adjustable movement relative thereto on said horizontal axis through an angle of at least 180 degrees, means for locking said carrier to said member in any one of a plurality of positions, a counterbalance connected to said carrier for adjustment relative thereto on a horizontal axis and adjustable to opposite sides of a vertical plane passing through said first named horizontal axis, a switch connected to said carrier and operable by tilting of said member on said first named horizontal axis, and level responsive operative means for tilting said member.

6. A level control switch mechanism including a frame, a member pivotally mounted on said frame on a horizontal axis, a switch carrier connected to said member for adjustable movement relative thereto on said horizontal axis, means for locking said carrier to said member in any one of a plurality of positions, a counterbalance connected to said carrier for adjustment relative thereto on a horizontal axis, a switch connected to said carrier and operable by tilting of said member on said first named horizontal axis, and level responsive operative means for tilting said member.

EARLE V. FRANCIS.

REFERENCES CITED

The following references are of record in the file of this patent:

UNITED STATES PATENTS

| Number | Name | Date |
|---|---|---|
| 2,429,158 | Francis | Oct. 14, 1947 |